(12) United States Patent
Lee et al.

(10) Patent No.: US 8,565,785 B2
(45) Date of Patent: Oct. 22, 2013

(54) METHOD AND APPARATUS FOR TRANSMITTING AND RECEIVING INTER-CELL INTERFERENCE INFORMATION IN COMMUNICATION SYSTEM

(75) Inventors: Kyung-Chun Lee, Suwon-si (KR); Sung-Oh Kwon, Seoul (KR); Neung-Hyung Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 175 days.

(21) Appl. No.: 13/023,973

(22) Filed: Feb. 9, 2011

(65) Prior Publication Data
US 2011/0195724 A1 Aug. 11, 2011

(30) Foreign Application Priority Data
Feb. 9, 2010 (KR) .................. 10-2010-0011997

(51) Int. Cl.
*H04W 24/00* (2009.01)
(52) U.S. Cl.
USPC ........ 455/456.1; 455/447; 455/448; 455/450; 455/452.1; 455/452.2; 37/335

(58) Field of Classification Search
USPC ........ 455/456.1, 452.2, 412.1, 447, 448, 450, 455/452.1
See application file for complete search history.

(56) References Cited

U.S. PATENT DOCUMENTS

| 7,912,475 B2 * | 3/2011 | Klang et al. ............... 455/452.2 |
| 8,165,098 B2 * | 4/2012 | Teo et al. ..................... 370/335 |
| 2010/0151876 A1 * | 6/2010 | Park et al. .................. 455/452.2 |

* cited by examiner

*Primary Examiner* — Wayne Cai
*Assistant Examiner* — Chuck Huynh
(74) *Attorney, Agent, or Firm* — The Farrell Law Firm, P.C.

(57) ABSTRACT

A method is provided for transmitting inter-cell interference information by a serving Evolved Node B (ENB) in a communication system. The method includes, if a specific resource is allocated to a User Equipment (UE) located in a service region of the serving ENB, checking a location of the UE in the service region; setting a High Interference Sensitivity (HIS) of the UE depending on the result of the checking; determining a location of the UE in an adjacent cell of the service region; setting a High Interference Transmission (HIT) of the UE depending on the determination result; and transmitting a High Interference Indicator (HII) for the specific resource, which includes the HIS and the HIT, to the adjacent cell.

16 Claims, 7 Drawing Sheets

METHOD AND APPARATUS FOR TRANSMITTING AND RECEIVING INTER-CELL INTERFERENCE INFORMATION IN COMMUNICATION SYSTEM

PRIORITY

This application claims priority under 35 U.S.C. §119(a) to a Korean Patent Application filed in the Korean Intellectual Property Office on Feb. 9, 2010 and assigned Serial No. 10-2010-0011997, the entire disclosure of which is incorporated herein by reference.

BACKGROUND OF THE INVENTION

1. Field of the Invention

The present invention generally relates to a method and apparatus for transmitting and receiving information about interference between adjacent cells (hereinafter, referred to as inter-cell interference information) in a communication system.

2. Description of the Related Art

In a communication system, interference between adjacent cells has a significant influence on the transmission efficiency of the cells. In particular, as a User Equipment (UE), also known as a terminal and a Mobile Station (MS), located in an edge region of a certain cell may receive a strong (or high-power) interference signal from adjacent cell(s), its transmission capacity may be limited more significantly by the interference signal rather than by noise. Studies have been conducted on a method of reducing inter-cell interference based on a randomization technique in which cells transmit signals with codes in different patterns independently. Recently, however, in order to more effectively minimize inter-cell interference, much research has been conducted on an interference avoidance scheme that reduces interference signals by transmitting and receiving information about the interference of pertinent adjacent cells between a serving cell and its adjacent cell.

A general interference avoidance scheme requires, first, a process of transmitting and receiving information about interference between adjacent cells. Specifically, when a serving cell allocates an arbitrary Up-Link (UL) resource to a UE located in its edge region, the UE may receive interference signals from adjacent cells when transmitting signals with the allocated UL resource. Therefore, the serving cell transmits information indicating that the UL resource allocated to the UE is sensitive or susceptible to an interference signal to each of its adjacent cells.

As described above, each cell transmits information about an interference signal regarding a certain resource to its adjacent cells, and, upon receiving the interference signal information, a cell reflects the received interference signal information during resource allocation thereby reducing inter-cell interference. Although the interference signal information may be represented by various forms, Relative Narrowband Transmit Power (RNTP) for a Down-Link (DL) and High Interference Indicator (HII) for a UL are now under discussion and have been defined in the Long-Term Evolution (LTE) standard. The purpose of RNTP and Hips to designate a low transmit power and a high interference for a specific resource on a cell-by-cell basis, respectively. Additionally, an Interference Overload Indicator (IOI) indicating a strong-interference situation has been defined for a UL.

Among the interference signal information, an HII generally indicates a level, i.e., High Interference Sensitivity (HIS), of an interference signal received from an adjacent cell and sensed by a UE when a serving cell allocates a specific resource to the UE located in an edge region of its service region (or coverage). Also, the HII implicitly indicates a level, i.e., High Interference Transmission (HIT), of an interference signal that the UE transmits to the adjacent cell. This is so because of the high correlation between interference signals from a serving cell and its adjacent cell.

However, an HIS and an HIT of a serving cell may have different values according to the location of a UE located in its adjacent cell. However, if the HII is set to simultaneously represent an HIS and an HIT of a serving cell as is conventionally done, efficiency of resource allocation may be degraded.

SUMMARY OF THE INVENTION

Embodiments of the present invention provide a High Interference Indicator (HII) separately including a High Interference Sensitivity (HIS) of a UE located in a serving cell and a High Interference Transmission (HIT) of the UE.

Embodiments of the present invention provide a resource allocation method and apparatus capable of minimizing inter-cell interference by transmitting and receiving an HII separately including an HIS of a UE located in a serving cell and an HIT of the UE, between a serving cell and its adjacent cell.

In accordance with one aspect of the present invention, there is provided a method for transmitting inter-cell interference information by a serving Evolved Node B (ENB) in a communication system. The method includes, if a specific resource is allocated to a User Equipment (UE) located in a service region of the serving ENB, checking a location of the UE in the service region; setting a High Interference Sensitivity (HIS) of the UE depending on a result of the checking; determining a location of the UE in an adjacent cell of the service region; setting a High Interference Transmission (HIT) of the UE depending on the determination result; and transmitting a High Interference Indicator (HII) for the specific resource, which includes the HIS and the HIT, to the adjacent cell. The HIS represents a sensitivity for an interference signal received from the adjacent cell and sensed by the UE, and the HIT represents a level of an interference signal received at the adjacent cell during signal transmission by the UE.

In accordance with one aspect of the present invention, there is provided a serving ENB for transmitting inter-cell interference information in a communication system. The serving ENB includes a controller for, if a specific resource is allocated to a UE located in a service region of the serving ENB, checking a location of the UE in the service region, controlling an HII generator to set an HIS of the UE depending on the result of the checking, determining a location of the UE in an adjacent cell of the service region, and controlling the HII generator to set an HIT of the UE depending on the determination result; and a transmitter for transmitting an HII for the specific resource, which includes the HIS and the HIT, to the adjacent cell under control of the controller. The HIS represents a sensitivity for an interference signal received from the adjacent cell and sensed by the UE, and the HIT represents a level of an interference signal received at the adjacent cell during signal transmission by the UE.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Embodiments of the present invention will now be described in detail with reference to the accompanying drawings. In the following description, specific details such as the detailed configuration and components are merely provided to assist the overall understanding of embodiments of the present invention. Therefore, it should be apparent to those skilled in the art that various changes and modifications of the embodiments described herein can be made without departing from the scope and spirit of the invention. Additionally, descriptions of well-known functions and constructions are omitted for clarity and conciseness.

Figure 1A:
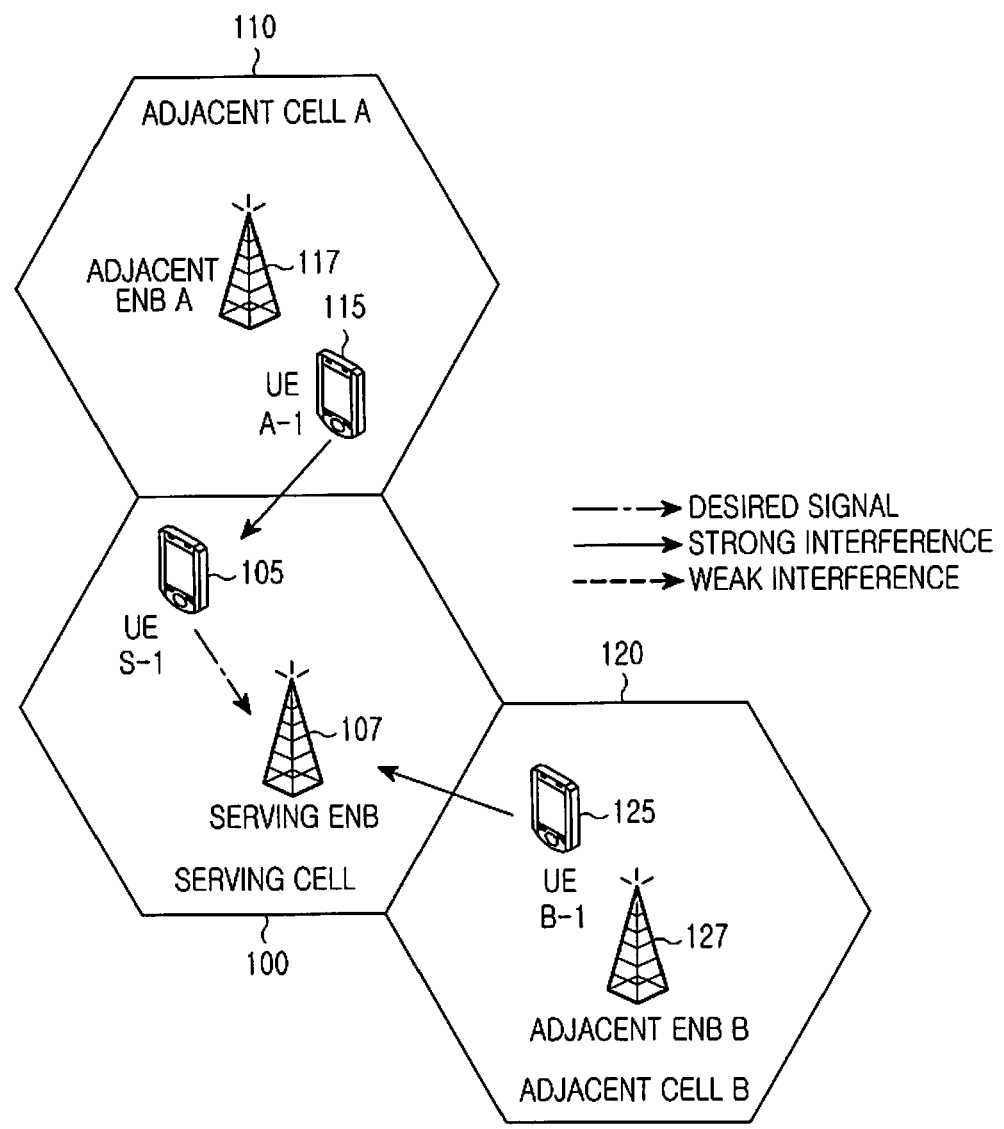
FIGS. 1A and 1B illustrate influences by interference signals between cells in a common communication system.
Figure 1B:
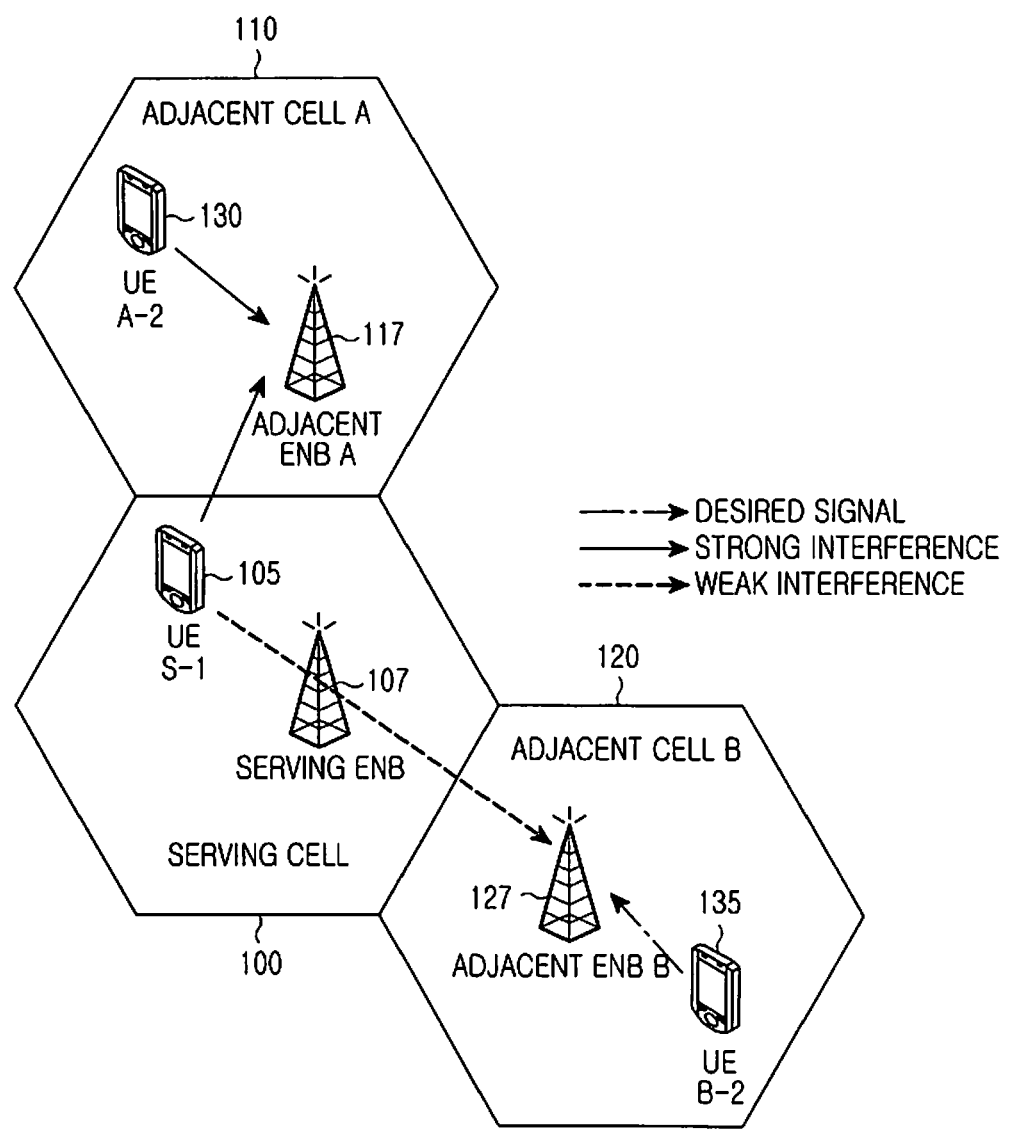

FIGS. 1A and 1B illustrate influences by interference signals between cells in a common communication system, in which the influences by interference signals depend on the location of a User Equipment (UE) in a serving cell and the distance between the UE's location and an adjacent cell.

Referring to FIG. 1A, a UE S-1 105 located in a serving cell 100 is located in an edge region of the serving cell 100, and a UE A-1 115 and a UE B-1 125 located in adjacent cells A and B 110 and 120 of the serving cell 100 are also located in edge regions of the adjacent cells A and B 110 and 120, adjoining the serving cell 100.

For example, it is assumed that a serving Evolved Node B (ENB) 107, also known as a serving Base Station (BS), allocates a resource corresponding to an n-th Physical Resource Block (PRB) to the UE S-1 105. In this case, if the UEs 115 and 125 located in the adjacent cells A and B 110 and 120 transmit signals, the UE S-1 105 may receive high-power interference signals. Additionally, assuming that an adjacent ENB A 117 and an adjacent ENB B 127 allocate the resource corresponding to the n-th PRB to the UE A-1 115 and the UE B-1 125 located in the places adjoining the serving cell 100, respectively, an Up-Link (UL) of the UE S-1 105 may be significantly affected by interference signals caused by signals transmitted by the UE A-1 115 and the UE B-1 125.

In order to indicate that the resource corresponding to the n-th PRB is a resource that is significantly affected by interference signals from cells, the serving ENB 107 sets an HII for the n-th PRB to "1" and transmits it to each of the adjacent ENBs A and B 117 and 127 through an X2 (i.e., Gigabit Ethernet) interface.

Upon receiving the HII being set to "1" for the n-th PRB, the adjacent ENBs A and B, 117 and 127, do not allocate the resource corresponding to the n-th PRB to the UE A-1 115 and the UE B-1 125 located in their cell edge regions, respectively, thereby avoiding inter-cell interference.

If the serving ENB 107 can allocate a total of N PRBs to the UEs, the serving ENB 107 sets an HII value for each of the N PRBs. Specifically, the serving ENB 107 receives Received Signal Strength Indicators (RSSIs) of signals received from adjacent ENBs adjoining the pertinent UEs, from the UEs to which resources corresponding to the N PRBs are allocated. The serving ENB 107 compares the RSSI with a predetermined threshold, and sets an HII for a related PRB to "1" if the RSSI is greater than or equal to the threshold. On the other hand, if the RSSI is less than the threshold, the serving ENB 107 sets the HII to "0". In the above-described manner, the serving cell 100 sets HIIs for the N PRBs in the form of a total of N bits, and transmits them to the adjacent cells A and B 110 and 120.

Generally, the HII represents sensitivity for an interference signal that a UE located in a service cell receives from an adjacent cell in an UL. That is, in the case where a serving ENB has allocated a specific resource to a UE located in its service region and an adjacent ENB allocates the specific resource to a UE located in an edge region of a service region of the adjacent ENB, the HII indicates a level of an interference signal that a UE located in the serving cell receives, in two steps of 1 or 0. When a UE located in the serving cell performs UL signal transmission, the HII implicitly indicates a level of an interference signal that a pertinent adjacent cell has received from the UE.

Referring to FIG. 1B, a serving ENB 107 allocates a specific resource to a UE S-1 105 located in a serving cell 100, and the UE S-1 105 is located in an edge region of the serving cell 100. Additionally, a UE A-2 130 and a UE B-2 135 located in adjacent cells A and B 110 and 120 of the serving cell 100 are also located in edge regions of the adjacent cells A and B 110 and 120, respectively, but in contrast to FIG. 1A, they are located in edge regions far from the serving cell 100. Therefore, if it is assumed that the UE A-2 130 and the UE B-2 135 are allocated the specific resource from the adjacent ENBs A and B 117 and 127, respectively, during UL signal transmission, the UE S-1 105 transmits a stronger interference signal to the UE A-2 130 located nearer than the UE B-2 135, and transmits a weaker interference signal to the UE B-2 135 located farther than the UE A-2 130.

However, as described above, in the conventional HII concept, a UE located in a serving cell represents an HIS and an HIT in one HII value, the HIS indicating levels of interference signals received from adjacent cells and sensed by the UE in a UL, and the HIT indicating a level of an interference signal that the UE located in the serving cell transmits to adjacent cells. The reason for representing the HIS and the HIT in one HII value is because of the high correlation between an HIS and an HIT of a UE located in an edge region of a pertinent cell.

Having received an HII being set to "1" for the specific resource, the adjacent ENB A 117 receives a high-power interference signal from the UE S-1 105. Therefore, the adjacent ENB A 117 does not allocate the specific resource for which an HII value is set to "1" and received from the serving ENB 107, to a UE(s) located in its service region, or allocates the specific resource to a UE(s) which is less affected by the interference signal, i.e., located in the central region of the adjacent cell A 110.

On the other hand, although the adjacent ENB B 127 has received an HII being set to "1" for the specific resource, the adjacent ENB B 127 may allocate the specific resource to the UE B-2 135 because it receives a lower-power interference signal from the UE S-1 105. However, since the adjacent ENB B 127 has received the HII value being set to "1" for the specific resource from the serving ENB 107, the adjacent ENB B 127, like the adjacent ENB A 117, may not allocate the specific resource to a UE(s) located in its service region, or allocate the specific resource only to a UE(s) located in the central region of the adjacent cell B 120.

In summary, having received the same HII being set to "1" for the specific resource from the serving ENB 107, the adjacent ENBs A and B 117 and 127 receive interference signals having substantially different strengths for the specific resource according to the their service regions and the location of the UE S-1 105. However, an ENB having received the conventional HII could not determine based on the HII whether it will receive an interference signal having a substantially different strength for the specific resource.

In the communication system, an HIS and an HIT have substantially different meanings.

Referring to FIG. 1A, assuming that the serving ENB 107 has allocated a resource corresponding to an n-th PRB to the UE S-1 105, a UL of the UE S-1 105 is equally vulnerable to interference signals from the adjacent cells A and B 110 and 120. Specifically, if the adjacent ENBs A and B 117 and 127 allocate the resource corresponding to the n-th PRB to the UEs A-1 and B-1 115 and 125, respectively, then the UE S-1 105 may sense interference signals at similar levels when the UEs A-1 and B-1 115 and 125 transmit signals. Therefore, as for an HIS of the n-th PRB, the same HIS value is set for both the adjacent cells A and B 110 and 120.

On the contrary, an HIT for the n-th PRB may have a different value according to the location of a UE located in the adjacent cell. Referring to FIG. 1B, because the UE S-1 105 is located very close to the UE A-2 130, the UE S-1 105 transmits a higher-power interference signal to the UE A-2 130 during UL signal transmission. Therefore, UEs located in an edge region of the adjacent cell A 110, including the UE A-2 130, are vulnerable to an interference signal caused by signal transmission by the UE S-1 105. Accordingly, it is preferable for the adjacent ENB A 117 not to allocate the resource corresponding to the PRB used by the UE S-1 105, to all UEs located in its cell edge region. However, because the UE B-2 135 is located further from the UE S-1 105 than the UE A-2 130, a level of the received interference signal caused by signal transmission by the UE S-1 105 is not so significant. For example, even though the adjacent ENB B 127 allocates the resource corresponding to the n-th PRB used by the UE S-1 105, to the UE B-2 135, the UE S-1 105 may receive an interference signal which is not so significant, from the UE B-2 135, and the UE B-2 135 may also receive an interference signal which is not so significant, from the UE S-1 105. Therefore, it is possible to allocate the resource corresponding to the n-th PRB used by the UE S-1 105, to the UE B-2 135.

Accordingly, the present invention includes an HII including a separate HIS and a separate HIT for a certain resource, and a method for increasing resource allocation efficiency by transmitting and receiving the proposed HII to/from adjacent cells. As mentioned above, while an HIS and an HIT have a correlation for a specific resource, they may have different values according to the locations of UEs located in relevant cells. Therefore, in the present invention, an HII includes an HIS and an HIT. Specifically, since the HIS represents an HIS for an interference signal received from a UE located in an adjacent cell, to which the resource allocated to a UE located in a serving cell is allocated, HIIs from all adjacent cells may have the same values. Thus, it is possible to broadcast an HIS value of the resource to adjacent cells of the serving cell. On the other hand, as for the HIT, different HIT values are set for adjacent cells depending on the UE to which the serving ENB has allocated a resource, and the distances from the adjacent cells. Therefore, different HIT values are transmitted to the adjacent cells.

The HII of the present invention is subdivided into an HIS and an HIT, increasing the amount of information to be exchanged between adjacent cells, compared with the existing HII, thus, requiring a method for efficiently exchanging the increased amount of information.

In a first embodiment of the present invention, an HII is represented by the form of a bitmap (HIS, HIT), which includes values of the HIS and the HIT, which are represented by "0" or "1" for each of N PRBs allocable in a relevant ENB. The HII may be periodically transmitted to adjacent cells at specific intervals, or may be transmitted aperiodically when a specific condition is met.

Figure 2A:
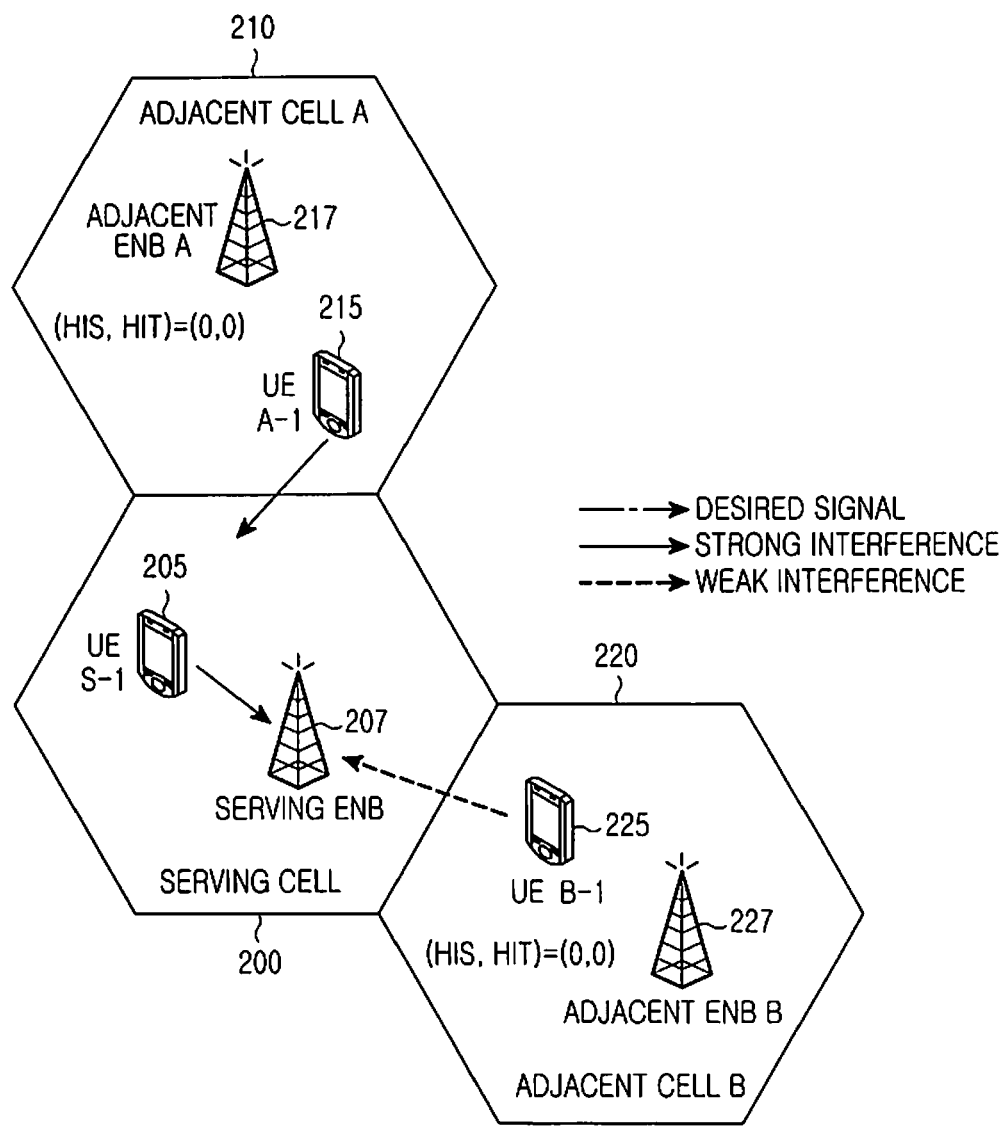
FIGS. 2A and 2B illustrate an HII represented by a bitmap according to a first embodiment of the present invention.
Figure 2B:
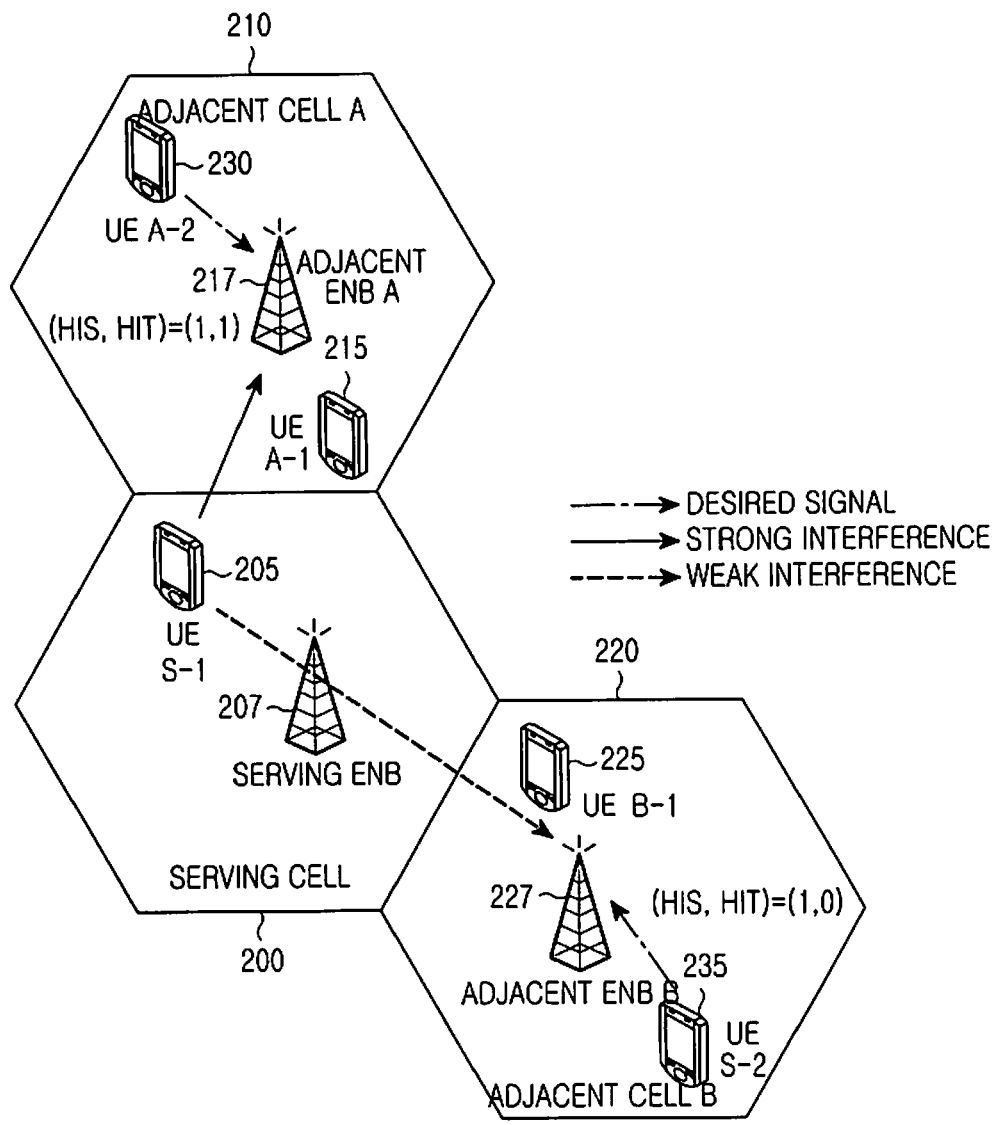

FIGS. 2A and 2B illustrate an HII represented by a bitmap according to the first embodiment of the present invention.

Referring to FIG. 2A, a UE S-1 205 is located in the central region of a serving cell 200. When a serving ENB 207 does not allocate a resource corresponding to an n-th PRB to UEs located in the serving cell 200, or allocates the resource corresponding to the n-th PRB of a UL to a UE located in the central region of the serving cell 200, like the UE S-1 205, the serving ENB 207 sets each of values of an HIS and an HIT for the n-th PRB to "0". Thereafter, the serving cell 200 transmits a value (0, 0) of an HII, values of an HIS and an HIT in which are set to "0", to each adjacent cell A and B 210 and 220 through an X2 interface. It means that the UE S-1 205 is not sensitive to the interference signals received from the adjacent cells A and B 210 and 220, and during UL signal transmission, the UE S-1 205 does not transmit a high-power interference signal to the adjacent cells A and B 210 and 220.

On the other hand, referring to FIG. 2B, when a serving ENB 207 allocates a resource corresponding to an n-th PRB of a UL to a UE S-1 205 located in an edge region of a cell 200, the UE S-1 205 receives high-power interference signals from adjacent cells A and B 210 and 220. When an adjacent ENB A 217 allocates the resource corresponding to the n-th PRB to a UE A-1 215 that is located in an edge region of the adjacent cell A 210, adjoining a serving cell 200, or when an adjacent ENB B 227 allocates the resource corresponding to the n-th PRB to a UE B-1 225 that is located in an edge region of the adjacent cell B 220, adjoining the serving cell 200, the UE S-1 205 may receive high-power interference signals from the UE A-1 215 and the UE B-1 225. Therefore, the serving ENB 207 sets an HIS value for the n-th PRB to "1".

However, in case of an HIT, its value is set different depending on the locations of the UEs A-1 and B-1 215 and 225, which are located in the adjacent cells A and B 210 and 220, respectively, and the distance from the serving cell 200. Assume that the resource corresponding to the n-th PRB is allocated to the UE S-1 205.

Since the UE S-1 205 is located in a region near the UE A-1 215, the UE S-1 205 may transmit a higher-power interference signal to the UE A-1 215 during its UL signal transmission. On the other hand, because the UE B-1 225 is located farther from UE S-1 205 than the UE A-1 215, the UE S-1 205 may transmit a lower-power interference signal to the UE B-1 225 during its UL signal transmission. Therefore, the serving ENB 207 sets a value of an HIT for the n-th PRB to "1" and transmits it to the adjacent cell A 210, and the serving ENB 207 sets a value of an HIT for the n-th PRB to "0", and transmits it to the adjacent cell B 220. As a result, the serving ENB 207 transmits HII values (1,1) and (1,0) including the differently set HIT values, to adjacent cells A and B 210 and 220 through an X2 interface.

As described above, a cell sets HIS and HIT values for each of N PRBs in a bitmap for its adjacent cells individually, and transmits an HII including the HIS and HIT values set in the bitmap form, to the adjacent cells through an X2 interface.

If the set HIS and HIT values for a specific resource are represented by the bitmap, the subdivided information of the HII can be transmitted, but the amount of information to be transmitted to the adjacent cells may double over that of the existing HII.

In a second embodiment of the present invention, unlike the first embodiment, a serving ENB compresses HIS and HIT values for each of its allocable N PRBs and represents them in an HII value.

As illustrated in FIGS. 2A and 2B, an HII value (HIS, HIT) for each PRB resource allocated by a serving ENB may have (0,0), (1,0), and (1,1), but a value of (0,1) is unavailable in a general environment. This is because HII's having a value of (HIS, HIT)=(0,1) means that although a UE, to which a serving ENB has allocated a resource, transmits a high-power interference signal to adjacent cells, the UE is not sensitive to interference signals received from the adjacent cells. However, UE's transmitting a high-power inference signal to adjacent cells generally means that the UE, to which the resource is allocated by the serving ENB, is located in an edge region of the serving cell, thus making the UE always be sensitive to the interference signals from the adjacent cells. Therefore, among the HII values, the combination of (HIS, HIT)=(0,1) is impossible, and a value of (HIS, HIT) may be represented only in a total of three combinations of (0, 0), (1, 0), and (1, 1). Thus, an HII value may be compressed using the three combinations.

Specifically, since a value of (HIS, HIT) can be represented only in a total of three combinations, the value of (HIS, HIT) is compressed using Equation (1) below.

$$\log_n M \qquad (1)$$

where n indicates the number of information to be represented, and M indicates the number of combinations of values that the information to be represented may have.

That is, n=2 since an HII value is represented by two values including HIS and HIT values, and M=3 since the HIS and HIT values are represented by three combinations. So, the HII value is represented with $\log_2 3 = 1.58$ bits in accordance with Equation (1). In comparison, while two bits are used in the first embodiment to express an HII value in a bitmap with HIS and HIT values, 1.58 bits are used in the second embodiment, reducing the amount of information to be transmitted.

For example, if the total number of PRBs allocable in a serving ENB is 20, then 20 times the 1.58 bits calculated by Equation (1), i.e., $20 \times \log_2 3 \approx 32$ bits are required, reducing the size (length) of bits to be transmitted, compared with 40 bits, which are required when an HII value is transmitted, in which HIS and HIT values are represented by separate bits, in transmitting the same HIS and HIT information. Although the bit size increases by about 1.6 times as compared to the 20 bits, which are required when the conventional single-value HII value is transmitted, it makes it possible to transmit a subdivided HII value.

Figure 3:
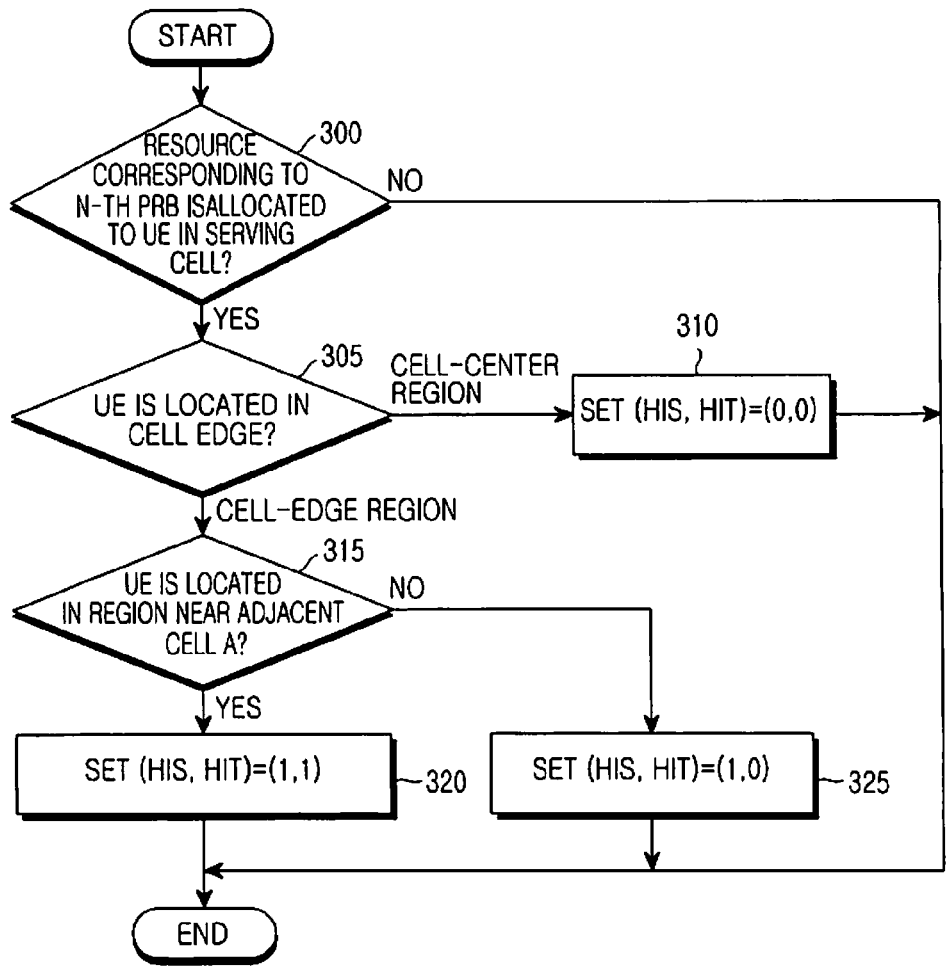
FIG. 3 illustrates a method for determining an HII value according to the first embodiment of the present invention.

FIG. 3 illustrates a method for determining an HII value according to the first embodiment of the present invention, in which an HII value, i.e., HIS and HIT values, for an adjacent cell A, one of adjacent cells of a serving cell, is determined, by way of example.

Referring to FIG. 3, a serving ENB determines in step 300 whether to allocate a resource corresponding to an n-th PRB to a UE(s) located in its serving cell. Upon determining to allocate the resource corresponding to an n-th PRB to the UE, the serving ENB checks in step 305 whether the UE is located in an edge region of its serving cell.

Specifically, the serving ENB receives information about a signal strength transmitted to the UE, and determines a location of the UE in the serving cell by comparing the received information with a predetermined threshold. The threshold is a threshold for signal strength, used to determine whether a location of a UE in the serving cell corresponds to an edge region of the serving cell, or a central region of the serving cell.

If it is checked that the UE is not located in the edge region of the serving cell, the serving ENB generates an HII value (0, 0), in which HIS and HIT values for the adjacent cell A are both set to "0", and transmits the generated HII value to the adjacent cell A in step 310.

On the other hand, if the UE is located in the edge region of the serving cell, then the serving ENB checks in step 315 whether the UE is located in a region near the adjacent cell A. That is, the serving ENB receives, from the UE, strength information of a signal that the UE receives from the adjacent cell A, and determines a location of the UE in the adjacent cell A by comparing the received information to a predetermined threshold. The threshold is a threshold for signal strength, used to determine whether the UE is located in a region near the adjacent cell A.

If it is checked that the UE is located in a region near the adjacent cell A, the serving ENB generates an HII value (1, 1), in which HIS and HIT values for the adjacent cell A are both set to "1", and transmits the generated HII value to the adjacent cell A in step 320. However, if the UE is not located in a region near the adjacent cell A, the serving ENB generates an HII value (1, 0), in which HIS and HIT values for the adjacent cell A are set to "1" and "0", respectively, and transmits the generated HII value to the adjacent cell A in step 325.

Generally, the HII value is information that is transmitted at intervals of tens to hundreds of milliseconds [ms]. Therefore, the HII value for an adjacent cell, which is determined by the above procedure, is determined at intervals of tens to hundreds of milliseconds.

While it is assumed in FIG. 3 that a service region of a cell is divided merely into a two-stage region, including a cell-center region and a cell-edge region to determine a location of a UE in a serving cell, and determine whether the UE is located in a region near an adjacent cell, and based thereon, HIS and HIT values of the adjacent cell are represented by a bitmap, the location of the UE may be determined in more detailed form.

For example, instead of dividing a service region of a cell into a two-stage region including a cell-center region and a cell-edge region, it is also possible to divide the service region into two or more regions and set HIS values so as to correspond to the two or more regions of the cell, respectively. Similarly, an HIT value of the cell may also be subdivided according to the distances between the UE and adjacent cells, which are divided into two or more regions. However, even in this case, there is a correlation between HIS and HIT values, and the HIS and HIT values may be compressed using the correlation according to the second embodiment of the present invention.

Figure 4A:
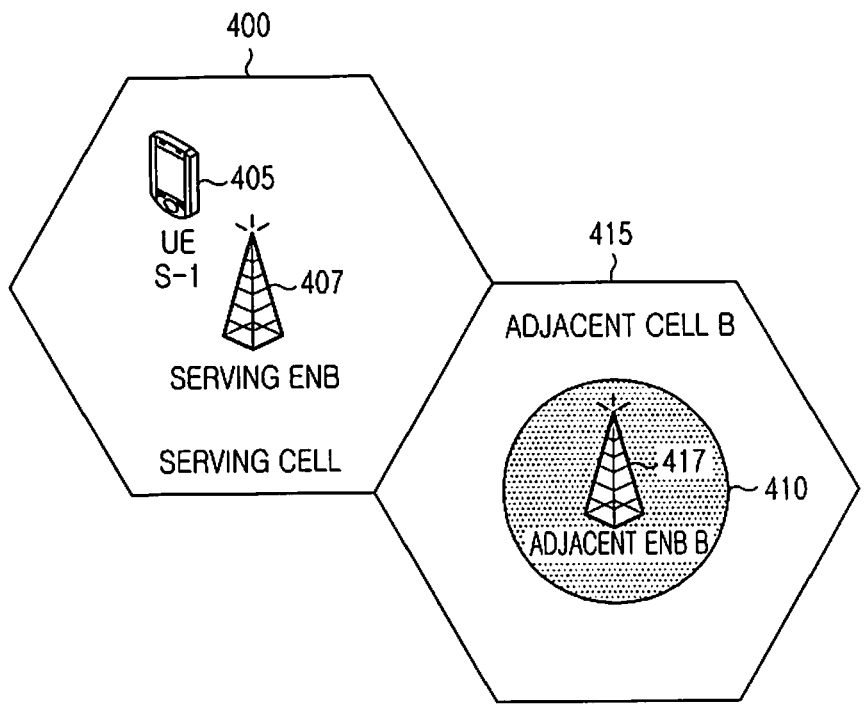
FIGS. 4A and 4B illustrates effects by an HII according to an embodiment of the present invention, as compared to the existing HII.
Figure 4B:
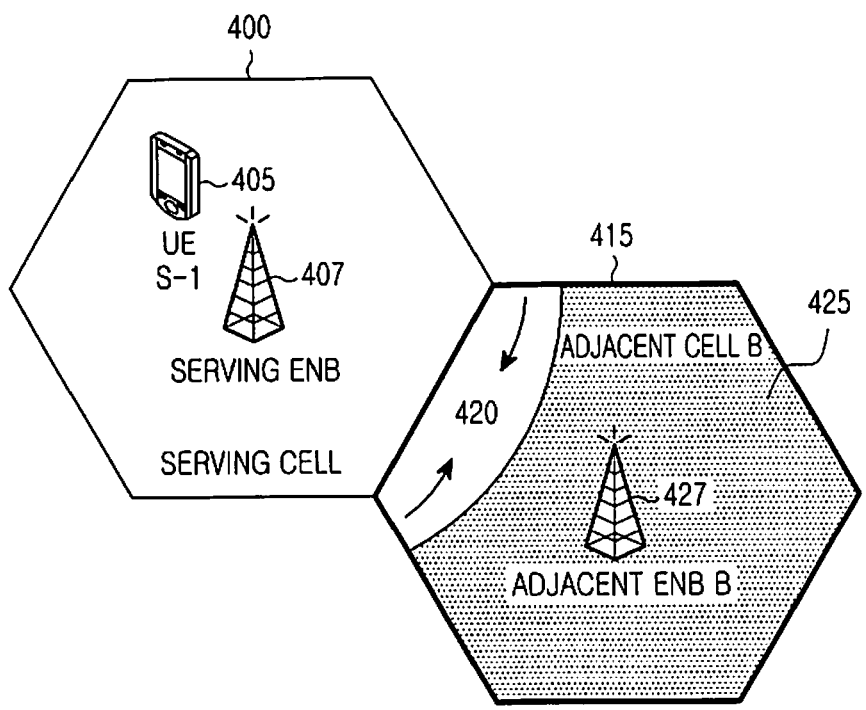

FIGS. 4A and 4B illustrate the effects of an HII according to an embodiment of the present invention, compared to an existing HII.

Referring to FIG. 4A, if an existing HII value is transmitted with a single bit, a serving ENB 407 allocates a resource corresponding to an n-th PRB to a UE S-1 405 located in an edge region of its serving cell 400, and transmits HII=1 for the UE S-1 405 to an adjacent cell, for example, an adjacent cell B 415. The adjacent ENB B 417 of the adjacent cell B 415 cannot determine HIS and HIT values for the UE, which are proposed in the present invention, with only the single-bit information or the received HII value. Therefore, taking into account the worst HII value of (HIS, HIT)=(1, 1) for the interference of the UE, only the UEs located in a central region 410 of the adjacent cell B 415 are set as candidates to which the resource corresponding to the n-th PRB is to be allocated.

On the other hand, referring to FIG. 4B, a serving ENB 407 divides an HII value for a UE S-1 405 into HIS and HIT values according to an embodiment of the present invention, and transmits them to adjacent cells, for example, to an adjacent cell B 415. Specifically, the serving ENB 407 sets an HII value for the UE S-1 405 as (HIS, HIT)=(1, 0), and transmits it to the adjacent cell B 415. Upon receiving the HII value for the UE S-1 405, an adjacent ENB B 427 does not allocate the resource corresponding to the n-th PRB to UEs (not shown) located in a region 420 near a serving cell 400.

As a result, UEs located in a region 425 obtained by excluding the region 420 near the serving cell 400 from the adjacent cell B 415 may be included in a group of UEs to which the resource corresponding to the n-th PRB can be allocated, contributing to an increase in the number of UEs to which the resource corresponding to the n-th PRB can be allocated, compared with FIG. 4A. That is, by transmitting an HII value separately including HIS and HIT values, as provided by the present invention, to adjacent cells, the region where the resource can be allocated increases, compared with when the conventional single-bit HII value is transmitted to adjacent cells, resulting in an increase in the cell capacity.

Taking into account the worst case scenario where all UEs are located in an edge region of the adjacent cell B 415, the resource corresponding to the n-th PRB is not allocated to any users in FIG. 4A, for avoidance of inter-cell interference. On the other hand, in FIG. 4B, the resource corresponding to the n-th PRB can be allocated to UEs which are located in the region 425 being apart from the region 420 near the serving cell 400, even though they are in the cell-edge region of the adjacent cell B 415, facilitating efficient management of resources.

Figure 5:
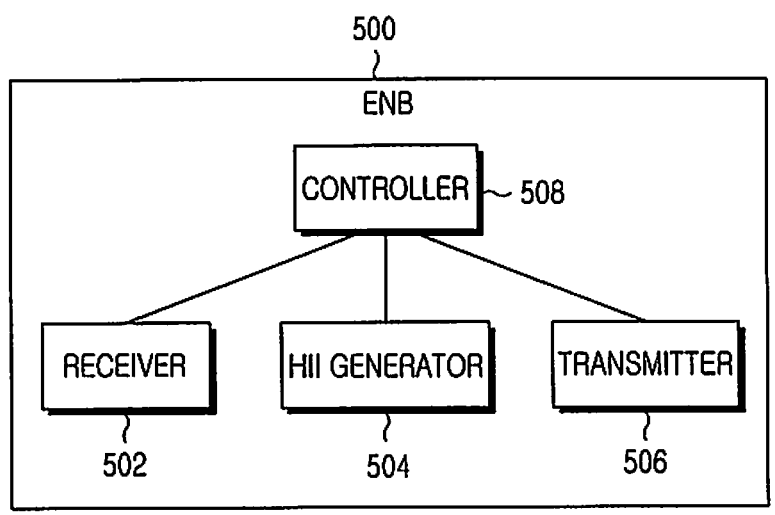
FIG. 5 illustrates a structure of a serving ENB according to an embodiment of the present invention.

FIG. 5 illustrates a structure of a serving ENB according to an embodiment of the present invention.

Referring to FIG. 5, a serving ENB 500 includes a receiver 502, an HII generator 504, a transmitter 506, and a controller 508.

The receiver 502 receives serving signal strength information and adjacent signal strength information from UEs located in a serving cell or a service region of the serving ENB 500, the serving signal strength information indicating a received strength for a signal that a UE has received from the serving ENB 500, and the adjacent signal strength information indicating a strength for each signal that the UE has received from adjacent cells of the serving ENB 500.

The controller 508 compares the serving signal strength information received by the receiver 502 with a predetermined threshold, and checks a location of a UE, i.e., determines whether the UE is located in an edge region of the serving cell or in a central region of the serving cell. If the UE is located in the edge region of the serving cell, the controller 508 controls the HII generator 504 to set an HIS value for the UE to "1". To the contrary, if the UE is located in the central region of the serving cell, the controller 508 controls the HII generator 504 to set both of HIS and HIT values for the UE to "0".

The controller 508 compares adjacent signal strength information received by the receiver 502 with a predetermined threshold. That is, the controller 508 compares a signal strength received from an adjacent cell with the threshold, and determines whether the UE is located in a region near the adjacent cell. If the UE is located in a region near the adjacent cell, the controller 508 controls the HII generator 504 to set an HIT value for the UE to "1". On the other hand, if the UE is not located in a region near the adjacent cell, the controller 508 controls the HII generator 504 to set an HIT value for the UE to "0".

The HIT generator 504 provides to the transmitter 506 an HII value including HIS and HIT values for the UE, which are set under the control of the controller 508. The transmitter 506 transmits the HII value to adjacent cells under the control of the controller 508.

As is apparent from the foregoing description, according to embodiments of the present invention, an HIS and an HIT are set depending on the location of a UE located in a serving cell and the distance between the location of the UE and a service region of an adjacent cell, and an HII including the set HIS and HIT is transmitted to the adjacent cell, making it possible to use a resource allocated to the UE even in the adjacent cell.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transmitting inter-cell interference information by a serving Evolved Node B (ENB) in a communication system, the method comprising:

allocating, by the serving ENB, a specific resource to a User Equipment (UE) located in a service region of the serving ENB;

checking a location of the UE in the service region;

setting a High Interference Sensitivity (HIS) of the UE, based on a result of the checking;

determining a distance from the location of the UE to a service region of an adjacent cell;

setting a High Interference Transmission (HIT) of the UE depending on the determined distance; and transmitting a High Interference Indicator (HII) for the specific resource, which includes the HIS and the HIT, to the adjacent cell, wherein the HIS represents a sensitivity for an interference signal received from the adjacent cell and sensed by the UE, and the HIT represents a level of an interference signal received at the adjacent cell during signal transmission by the UE.

2. The method of claim 1, wherein checking the location of the UE in the service region comprises:

determining a specific partial region where the UE is located, wherein the service region includes a plurality of partial regions which are divided according to a distance from a center of the service region.

3. The method of claim 1, wherein determining the distance from the location of the UE to the service region of the adjacent cell comprises:

determining a specific partial region where the UE is located, wherein the service region includes a plurality of partial regions which are divided according to a distance from a center of a service region of the adjacent cell.

4. The method of claim 1, wherein checking the location of the UE in the service region comprises:

determining whether the location of the UE in the service region corresponds to a first central region within a specific distance from a center of the service region, or a first remaining region obtained by excluding the first central region from the service region.

5. The method of claim 4, wherein determining the distance from the location of the UE to the service region of the adjacent cell comprises:
if the location of the UE corresponds to the first remaining region, determining whether the location of the UE corresponds to a second central region within a specific distance from a center of the adjacent cell, or a second remaining region obtained by excluding the second central region from the service region of the adjacent cell.

6. The method of claim 5, wherein the setting comprises:
if the location of the UE corresponds to the first remaining region, setting information indicating that the HIS of the UE is "High"; and
if the location of the UE corresponds to the second remaining region, setting information indicating that the HIT of the UE is "Strong".

7. The method of claim 1, wherein the HII is represented by a bit pair including a bit indicating whether the HIS is "High", and a bit indicating whether the HIT is "Strong".

8. The method of claim 7, wherein the HII is compressed by excluding a bit pair indicating that the HIS is "Low" and the HIT is "Strong", from all possible combinations of the bit pairs.

9. A serving Evolved Node B (ENB) for transmitting inter-cell interference information in a communication system, the serving ENB comprising:
a controller for allocating a specific resource to a User Equipment (UE) located in a service region of the serving ENB, checking a location of the UE in the service region, controlling a High Interference Indicator (HII) generator to set a High Interference Sensitivity (HIS) of the UE depending on a result of the checking, determining a distance from the location of the UE to a service region of an adjacent cell, and controlling the HII generator to set a High Interference Transmission (HIT) of the UE depending on the determined distance; and
a transmitter for transmitting an HII for the specific resource, which includes the HIS and the HIT, to the adjacent cell under control of the controller;
wherein the HIS represents a sensitivity for an interference signal received from the adjacent cell and sensed by the UE, and the HIT represents a level of an interference signal received at the adjacent cell during signal transmission by the UE.

10. The serving ENB of claim 9, wherein the controller checks the location of the UE in the service region by determining a specific partial region where the UE is located, and
wherein the service region includes a plurality of partial regions which are divided according to a distance from a center of the service region.

11. The serving ENB of claim 9, wherein the controller determines the distance from the location of the UE to the service region of the adjacent cell by determining a specific partial region where the UE is located, and
wherein the service region includes a plurality of partial regions which are divided according to a distance from a center of a service region of the adjacent cell.

12. The serving ENB of claim 9, wherein the controller checks the location of the UE in the service region by determining whether the location of the UE in the service region corresponds to a first central region within a specific distance from a center of the service region, or a first remaining region obtained by excluding the first central region from the service region.

13. The serving ENB of claim 12, wherein to determine the distance from the location of the UE to the service region of the adjacent cell, if the location of the UE corresponds to the first remaining region, the controller determines whether the location of the UE corresponds to a second central region within a specific distance from a center of the adjacent cell, or a second remaining region obtained by excluding the second central region from the service region of the adjacent cell.

14. The serving ENB of claim 13, wherein if the location of the UE corresponds to the first remaining region, the controller controls the HII generator to set information indicating that the HIS of the UE is "High", and if the location of the UE corresponds to the second remaining region, the controller controls the HII generator to set information indicating that the HIT of the UE is "Strong".

15. The serving ENB of claim 9, wherein the HII is represented by a bit pair including a bit indicating whether the HIS is "High," and a bit indicating whether the HIT is "Strong".

16. The serving ENB of claim 15, wherein the HII is compressed by excluding a bit pair indicating that the HIS is "Low" and the HIT is "Strong", from all possible combinations of the bit pairs.

* * * * *